United States Patent Office 3,083,085
Patented Mar. 26, 1963

3,083,085
LIQUID-LIQUID EXTRACTION RECOVERY OF VANADIUM AND MOLYBDENUM VALUES USING A QUATERNARY AMMONIUM EXTRACTANT
Clifford J. Lewis and James L. Drobnick, Lakewood, Colo., assignors to General Mills, Inc., a corporation of Delaware
No Drawing. Filed Nov. 13, 1959, Ser. No. 853,702
11 Claims. (Cl. 23—312)

This invention relates to the recovery of molybdenum and vanadium values from aqueous solution and in particular to a liquid-liquid extraction process employing quaternary ammonium compounds.

Molybdenum and/or vanadium containing aqueous solutions are encountered in a variety of industrial processes. One of the common of these processes is the recovery of uranium from its ores from either acid or alkaline leach systems. To date, no satisfactory economic method has been provided for the recovery of either of these metals from such aqueous solutions, particularly the alkaline solutions. While molybdenum could possibly be recovered from alkaline solutions by adding sulfuric acid to adjust the pH suitably for precipitation of the molybdenum with suitable sulfides, the quantity of acid required is such as to usually render the process uneconomical. In the prior liquid-liquid extraction processes for the recovery of vanadium values, organo phosphorus compounds, secondary or tertiary amines or combinations of the amines with the organo phosphorus compounds, such as di-2-ethyl hexyl phosphoric acid have been used. The extractants are effective in acidic solutions only, since alkaline solutions "spring" the amines to the free state and thus inactivate the extractive power of the extractant. The organo phosphorus compounds are also inactive in alkaline solutions, since alkaline solutions are effective stripping agents for this class of extractants.

It has now been discovered that a quaternary ammonium compound of the type

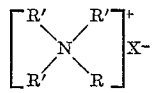

where R is a lower alkyl group having 1 to 4 carbon atoms and the R' groups may be alike or different and are long chain aliphatic hydrocarbon groups having from 8 to 18 carbon atoms and X is an anion, can be advantageously employed to extract molybdenum and/or vanadium values from alkaline solutions as well as from acidic solutions. While specific reference has been made to solutions resulting from the processing of uranium ores, this invention is applicable to any molybdenum and/or vanadium containing aqueous solution encountered in any other process.

It has also been discovered that this process using the quaternary ammonium compounds described provides a means for the control or removal of thionates very often associated with these metals.

It is therefore an object of this invention to provide a novel process for the recovery of molbdenum and/or vanadium values from aqueous solutions.

It is also an object of this invention to provide such a process for the recovery from alkaline solutions.

It is a further object of this invention to provide a process for the control or removal of thionates from alkaline solutions.

Briefly the process consists in contacting a molybdenum and/or vanadium containing aqueous solution with a water immiscible organic phase containing the quaternary ammonium compound whereby the metal values are preferentially extracted into the organic phase. The loaded organic phase is then separated from metal-barren solution by virtue of their immiscibility. The metal values are then stripped from the loaded organic phase resulting in a purified and concentrated aqueous metal concentrate, from which the metals can be recovered by any conventional method.

The aqueous solutions, the starting point of the present process, are either acid or alkaline solutions containing molybdenum and/or vanadium values. These solutions may be of a large variety and as stated previously are encountered in many industrial processes. Often these solutions are waste solutions of the processes which were generally discarded, as no suitable means of recovering metal values were known. In addition to these values, the solutions may contain other metals and other impurities such as the thionates and phosphates. Most of the solutions employed in the present invention are waste solutions remaining after the removal of some other metal, so that the solutions contain chiefly molybdenum and/or vanadium associated with impurities such as the thionates or phosphates. Accordingly the present process can be used with any aqueous solution containing molybdenum and/or vanadium.

As molybdenum and vanadium are often associated with uranium, aqueous solutions containing these metals are commonly encountered in uranium processing. For this reason, a large portion of the data in the examples to follow was gathered on the aqueous solutions encountered in uranium processing. Accordingly a brief discussion of the uranium processing will follow to illustrate some typical aqueous solutions on which the present process can be practiced. However, aqueous solutions from other operations, which may also include impurities such as thionates and phosphates, may be employed.

In the processing of uranium ores, two leaching systems are generally employed. The first process using an acid for leaching the uranium ore is known as the "acid leach" circuit; whereas the second process using an alkali-carbonate leaching solution is known as the "alkaline leach" circuit.

In the acid circuit the uranium ore is leached with sulfuric acid. The uranium pregnant acid solution is then contacted with a specific organo phosphate or specific amine salt dissolved in a diluent such as kerosine. The amine extraction circuit is by far the most prevalent in commercial use. Both uranium and molybdenum are loaded into the organic phase. Vanadium, if present, remains largely in the acid solution and has been largely discarded. The organic phase is then separated by virtue of immiscibility from the aqueous solution. The uranium is then stripped from the organic phase by a suitable stripping agent, such as sodium chloride, the molybdenum remaining in the organic phase. The organic phase is then recycled. However, as molybdenum builds up in the system, the organic phase will lose its ability to extract uranium because it will be saturated or "loaded" with molybdenum. It is therefore common practice to "bleed" a small amount of the organic phase through a scrubbing operation to remove the molybdenum, freeing the amine for recycle and thereby keeping the molybdenum at an acceptable level. The scrubbing agents generally used are alkalis such as sodium carbonate, ammonium hydroxide, caustic soda or combinations thereof. The molybdenum therefore is found in the aqueous alkaline scrub solution and this solution is one which may be employed in the present process.

In the alkaline leach circuit the uranium ore is treated with a solution of sodium carbonate-sodium bicarbonate which dissolves the uranium, molybdenum and vanadium. The uranium is then precipitated with caustic soda, the molybdenum and vanadium remaining in the alkaline solution. To obtain a carbonate solution for recycle for dissolution of uranium, this solution is treated with carbon dioxide gas to form the carbonate. However, the solution will contain molybdenum and/or vanadium which will build up in the solution and decrease the ability of the solution to dissolve the uranium so that a portion is again "bled" off, for removal of the molybdenum and vanadium. This removal of these metals from this aqueous solution can be accomplished by the process of the present invention.

If both molybdenum and vanadium are present, they can both be removed together by means of the present process and then separated or they can first be separated by conventional methods and the present process employed with individual aqueous solutions thereof to provide a highly pure concentrate.

The quaternary ammonium compounds which may be employed in this invention are of the type previously defined, which may be described as a trifatty monoalkyl quaternary ammonium salt in which the fatty group has from 8 to 18 carbon atoms and the alkyl group has from 1 to 4 carbon atoms. The fatty groups may be alike or different. These are long chain aliphatic hydrocarbon groups, straight or branched chain, saturated or unsaturated. As a general matter they are prepared from the mixtures of fatty acids resulting from the fatty oils so that the groups will generally be of varying lengths. For convenience only one of these fatty compounds was used in the examples to follow. The quaternary used was one in which the fatty groups were mixed and had 8 and 10 carbon atom chains, in that the material was prepared from the $C_8$–$C_{10}$ fraction of fatty acids derived from coconut oil. Other fatty acids or mixtures thereof either pure or the mixed acids from oils such as animal and vegetable oils may be used. The compounds may be prepared in any of the well known and conventional manners of forming quaternary ammonium compounds.

In general any anion may be used for the quaternary ammonium compound. The chloride, the anion most commonly present in commercially available quaternary ammonium compounds is not desirable in some circumstances, where other anions are to be preferred. Such circumstances arise in alkaline solutions where the chloride ion is the preferred stripping reagent for the metals, and the presence of this ion in sufficient concentration in alkaline solutions thereby reduces the efficiency of extraction of the quaternary ammonium compound. In such solutions the sulfate quaternary compound may be employed. In acid solutions the presence of the chloride ion does not interfere as the chloride ion will not strip in an acid solution. In such solutions the chloride can accordingly be used. Commercially available quaternary ammonium chloride may be converted to the other salts by simple treatment with the corresponding acid, as for example, the sulfate may be formed by treating the chloride with sulfuric acid.

In addition to the quaternary ammonium compound, the organic phase generally includes other materials such as a conditioner which typically is a long chain aliphatic alcohol such as capryl alcohol, isodecanol, tridecyl alcohol or 2-ethyl hexanol, and a diluent such as kerosine or high flash point fuel oils. The composition of the organic phase is not critical, but is generally preferred that it consist of from 5 to 15 volume percent quaternary ammonium compound, 2 to 10 volume percent of conditioner with the remainder being kerosine or fuel oil.

The stripping solutions employed in the present invention may be of a large variety. In general, the alkali metal, alkaline earth metal and ammonium salts such as the chloride and nitrate may be used. However any other electrolyte suitable for regeneration may be used. Illustrative of these stripping agents are sodium chloride, sodium nitrate, calcium chloride and ammonium chloride and nitrate. In general, the relatively inexpensive sodium chloride is preferred. In addition to the electrolyte used, an alkali, such as sodium hydroxide or ammonium hydroxide, can be employed in conjunction with the electrolytes to obtain higher stripping coefficients. Strongly alkaline solutions, i.e. 5 to 20% NaOH, can also be used to strip the metals from the organic phase.

The liquid-liquid extraction process can be carried out in a continuous counter-current mixer-settler unit. The number of stages can be varied as desired depending on the efficiency of extraction and stripping. By adjustment of the relative volumes of aqueous metal pregnant solution and stripping solution introduced to the liquid-liquid extraction apparatus, it is possible to achieve a high degree of metal concentration.

Turning now to the solution of molybdenum resulting from the acid leach circuit, this is an alkaline solution containing chloride ion. The chloride ion is present due to the sodium chloride stripping of uranium from the amine organic phase previously mentioned. When molybdenum is scrubbed from this organic phase with alkali such as sodium carbonate the resulting strongly alkaline solution will contain molybdate and chloride ions. Because of this, the obvious method of recovering the molybdenum by precipitation as a sulfide under acid pH or by use of an amine extractant is either impossible or economically unfeasible. If precipitation were contemplated the pH must be adjusted to a pH approximately below 4.0. Even using a relatively inexpensive acid such as sulfuric acid, an uneconomical amount of acid would be necessary to reduce the pH to a level suitable for precipitation. An amine extractant cannot be used because of the chloride content which is sufficient to strip the molybdenum from the amine extractant in the first place so that no extraction occurs. The use of cation extractants such as organo phosphates would again require adjustment to a low pH level, which would be uneconomical.

The molybdenum can be extracted, however, by using the quaternary ammonium compounds previously described which will extract molybdate and other valence states of molybdenum from this aqueous scrub solution. The extractant will perform satisfactorily in the presence of chloride ion under slightly acid pH conditions which can be obtained by the use of relatively inexpensive sulfur dioxide gas. The relatively inexpensive sulfur dioxide gas is preferred as the use of other acid anhydrides or acids increase the expense of operation. The molybdenum thus extracted can be subsequently concentrated and recovered by stripping with relatively cheap sodium chloride and precipitation in the conventional manner with calcium ion to produce an almost pure molybdenum salt.

In carrying out this method the aqueous alkaline scrub solution is treated with sulfur dioxide gas to destroy alkalinity and bring the pH to about 4.0. This acid solution is then contacted with an organic phase containing the quaternary ammonium chloride which will extract the molybdenum almost quantitatively. Separation is accomplished by virtue of immiscibility and the molybdenum barren aqueous phase may then be discarded. The molybdenum pregnant organic phase is then stripped of its molybdenum values using an aqueous stripping solution containing sodium chloride and sodium carbonate. The aqueous molybdenum concentrate is therefore essentially an aqueous solution containing sodium chloride sodium bicarbonate, sodium molybdate and sodium sulfite. If treated with calcium chloride at 25° C. a precipitate of calcium molybdate containing practically all the molybdenum but contaminated with some calcium sulfite can be obtained. The contamination with the sulfite can be avoided by a two stage addition of the calcium chloride. In the first stage a calcium sulfite precipitate is obtained which can be filtered off and on the addition of more calcium chloride a practically pure calcium molybdate precipitate results. In the subsequent recovery it is necessary that the precipitation be carried out at room temperatures to maintain any bicarbonate ion in solution as calcium bicarbonate, since calcium bicarbonate hardness is precipitated by heating and this is to be avoided.

The following specific example will serve to more clearly illustrate the invention.

EXAMPLE I

*Recovery of Molybdenum From a Uranium Mill Acid Leach Solvent Extraction Alkaline Waste Scrub Solution*

The aqueous feed solution used in this example had the following analysis:

| Material— | Grams per liter |
|---|---|
| Mo | 2.15 |
| $U_3O_8$ | 0.129 |
| Cl | 25.1 |
| $SO_4$ | 0.004 |
| $Na_2CO_3$ | 21.2 |
| $NaHCO_3$ | 52.5 |

This investigation was conducted in a continuous counter current mixer-settler liquid-liquid extraction unit. The unit contained four extraction stages and three stripping stages. The aqueous feed was fed into the first extraction cell while the organic phase was fed into the fourth cell. In stripping the Mo pregnant organic phase was fed into the first cell while the stripping solution was introduced into the third cell. The aqueous feed was processed with sulfur dioxide prior to introduction into the extraction cell until the pH of the solution was in the range of pH 4.0 and pH 4.5. The solvent contained 10.5 volume percent of a trifatty monomethyl ammonium chloride, the fatty group having 8 and 10 carbon atoms, 2.5 volume percent isodecanol, and 87 volume percent kerosine. A combination sodium chloride-sodium carbonate stripping solution was used for the stripping operation.

Precipitation of calcium molybdate was accomplished by a two-step process. A stoichiometric amount of calcium chloride for the sulfite ion was added to the molybdenum aqueous concentrate to precipitate calcium sulfite. Following the removal of precipitated calcium sulfite by filtration, 40 percent over stoichiometric requirement of calcium chloride for molybdenum was added to precipitate calcium molybdate. Both precipitations were carried out at approximately 25° C. for 30 minutes.

The results are illustrated in the following Table I, which illustrates that molybdenum is extracted without difficulty in the presence of high chloride ion.

treated with carbon dioxide to form the carbonate, which solution, after removal of the molybdenum and/or vanadium and other impurities, can be recycled to the parent alkaline leach solution. Extraction with the quaternary ammonium compounds previously described will not only remove the molybdenum and/or vanadium, but will also remove other undesirable impurities to result in a purified solution of carbonate which can re-enter the parent alkaline recycle stream.

In addition the use of these quaternary compounds provides for the control or removal of compounds known as thionates.

Many uranium ores contain sulfur-bearing materials, particularly sulfur compounds of iron. When these sulfur materials are exposed to the leaching effect of sodium carbonate-sodium bicarbonate, especially at elevated temperatures and under oxidizing conditions, as is common in uranium mill circuits, the sulfur begins to oxidize from the low valence state toward the stable sulfate form. However such oxidation is rarely complete and results in an intermediate series of partially oxidized sulfur compounds known as thionates. This is a series of metal salts of sulfur and oxygen anions of which sodium thiosulfate $Na_2S_2O_3$ is typical. These thionates are objectionable for several reasons, one of which is that they interfere with the leaching of uranium. The quaternary compounds provide a means for a process which will remove or at least maintain the thionates at a controllable level thus enhancing the efficiency of the circuit.

The ability of the quaternary ammonium compound to load molybdenum simultaneously while loading thionates produces a unique condition for the subsequent removal of molybdenum and thionates from the organic phase. While it might be thought possible to remove the materials from the organic quaternary phase by the addition of a strong solution of caustic, which would thus convert the quaternary ammonium compound to the hydroxyl state while sodium molybdate and sodium thionate would remain as soluble materials in the caustic stripping solution, this would still leave the problem of precipitating the molybdenum into the form of a recoverable concentrate without the use of an uneconomic amount of acid to neutralize the alkalinity present. However, in addition to loading the molybdenum and the thionates, the quaternary compound also loads carbonate and bicarbonate anions, which enables the organic phase to be stripped and regenerated with a neutral solution of common salt-sodium chloride. By scrubbing the molybdenum-thionate-carbonate pregnant organic phase with dilute salt water containing approximately 10% by weight

TABLE I

| Hourly sample | Flow rates, milliliters per minute | | | Analytical data | | | | | | Molybdenum recovery data | | Molybdenum stripping solution |
|---|---|---|---|---|---|---|---|---|---|---|---|---|
| | | | | Molybdenum, grams per liter | | | | pH | | | | |
| | Organic | Aqueous | Strip | Barren aqueous | Loaded organic | Stripped organic | Aqueous concentrate | Barren aqueous | Aqueous concentrate | Percent extraction | Percent stripped | |
| 1 | 12.0 | 44 | 3.0 | 0.020 | -------- | 0.64 | -------- | 4.35 | -------- | 99.1 | -------- | 1.25 M NaCl plus 15 gm./1$Na_2CO_3$. |
| 2 | 12.0 | 44 | 2.8 | 0.022 | 9.39 | 2.90 | -------- | 4.25 | 6.40 | 99.0 | 69.1 | Do. |
| 3 | 11.5 | 43 | 3.0 | 0.035 | 9.70 | 1.45 | 5.6 | 4.60 | -------- | 98.4 | 85.5 | 1.50 M NaCl plus 30 gm./1$Na_2CO_3$. |
| 4 | 11.0 | 42 | 3.2 | 0.040 | 9.19 | 2.04 | 5.1 | 4.65 | 6.40 | 98.1 | 77.8 | Do. |
| 5 | 11.5 | 41 | 2.8 | 0.029 | 8.53 | 0.45 | 18.1 | 4.50 | 6.90 | 98.7 | 94.7 | 1.50 M NaCl plus 60 gm./1$Na_2CO_3$. |
| 6 | 11.5 | 41 | 3.0 | 0.028 | 8.78 | 0.44 | 21.1 | 4.75 | 6.90 | 98.7 | 95.0 | Do. |
| 7 | 11.4 | 41 | 3.0 | 0.023 | 8.12 | 0.35 | 28.1 | 4.75 | 6.95 | 98.9 | 95.7 | Do. |
| 8 | 10.9 | 41 | 2.9 | 0.018 | 7.94 | 0.30 | 31.8 | 4.70 | 7.05 | 99.2 | 96.2 | Do. |
| 9 | 10.9 | 41 | 2.9 | 0.021 | 7.52 | 0.085 | 37.7 | 4.75 | 7.05 | 99.0 | 98.9 | Do. |
| 10 | 11.0 | 41 | 3.0 | 0.018 | 7.78 | 0.067 | 40.1 | 4.80 | 7.05 | 99.2 | 99.1 | Do. |
| 11 | 11.0 | 41 | 3.1 | 0.020 | 7.71 | 0.094 | 40.7 | 4.80 | 7.05 | 99.1 | 98.8 | Do. |
| 12 | 11.0 | 41 | 3.0 | 0.021 | 7.49 | 0.087 | 45.4 | 4.80 | 7.05 | 99.0 | 98.8 | Do. |

Turning now to the molybdenum and/or vanadium containing solutions encountered in the alkaline leach circuit in uranium processing, this solution is obtained as previously mentioned by the precipitation of uranium from the sodium carbonate sodium bicarbonate leach by the addition of caustic soda. This solution can then be sodium chloride, an aqueous phase is obtained which is only weakly alkaline but nevertheless, contains all the carbonates, molybdates, and thionates, presumably as their sodium salts. The fact that this solution remains alkaline by virtue of the carbonate present is very important, because such alkalinity prevents the decomposition of the thionates, which decomposition would automatically reduce the molybdenum to a lower valence state and this in turn would result in molybdenum remaining in the organic phase. However, because the aqueous product solution from the sodium chloride strip remains alkaline, it is possible to add the cheap reagent, high calcium hydrated lime, to remove the carbonates as precipitates and then subsequently add calcium chloride to precipitate molybdenum as calcium molybdate product concentrate while the thionates remain soluble and are discarded in the waste filtrate from the recovery of the high purity calcium molybdate salt.

The following examples will serve to illustrate this feature of the invention.

EXAMPLE II

*Recovery of Molybdenum From an Alkaline Leach Uranium Mill Molybdenum Pregnant Waste Bleed Stream*

The alkaline molybdenum pregnant waste bleed stream used had the following chemical analysis:

| Constituent— | | per liter |
|---|---|---|
| Mo | grams | 6.3 |
| $Na_2S_2O_3$ | do | 10.3 |
| Cl | do | 1.20 |
| NaOH | do | 7.0 |
| $Na_2CO_3$ | do | 79.0 |
| $U_3O_8$ | do | 0.025 |
| pH | | 13.0 |

The organic phase used contained 10.5 volume percent of the quaternary ammonium chloride of Example I, 7.5 volume percent isodecanol and 82 volume percent kerosine. The aqueous molybdenum stripping solution was a 1.5 molar solution of sodium chloride. A 100 gram per liter aqueous solution of sulfuric acid was used to convert the molybdenum stripped chloride form of the quaternary ammonium compound to the sulfate form before entering the extraction circuit. The organic to aqueous to stripping ratio was 3 to 1 to 5 respectively.

Calcium molybdate was precipitated from the molybdenum aqueous concentrate by first adding 40 percent excess of the stoichiometric amount of calcium hydroxide for the sodium carbonate present. Following the removal of calcium carbonate by filtration, 30 percent excess of the stoichiometric amount of calcium chloride was added to precipitate the molybdenum as calcium molybdate. All precipitations were carried out at approximately 25° C. for 30 minutes. The results can be seen from the following Tables 2 and 3.

TABLE 2
*Operating Data*

| Operating time, hours | Analytical data, grams per liter | | | | | Percent stripped Mo |
|---|---|---|---|---|---|---|
| | Raffinate | | Loaded organic Mo | Stripped organic Mo | Percent extraction Mo | |
| | Mo | Cl | | | | |
| 4 | 0.79 | 4.40 |  | 0.052 | 87.5 |  |
| 8 | 0.30 | 2.30 |  | 0.036 | 94.8 |  |
| 12 | 0.41 | 1.62 |  |  | 93.5 |  |
| 16 | 0.39 | 1.62 | 2.12 | 0.006 | 93.8 | 97.0 |
| 18 | 0.41 | 1.56 | 2.26 |  | 93.5 |  |
| 20 | 0.54 | 1.56 | 2.26 | 0.013 | 91.5 | 94.0 |

TABLE 3
*Liquid-Liquid Extraction Product Analytical Data*

| Product | Mo, g./l. | $CaMoO_4$, percent | NaOH, g./l. | $NaHCO_3$, g./l. | $Na_2CO_3$, g./l. | $Na_2S_2O_3$, g./l. | Cl, g./l. |
|---|---|---|---|---|---|---|---|
| Aqueous feed | 6.3 |  | 7.00 |  | 79.0 | 10.3 | 1.20 |
| Raffinate | 0.54 |  |  | 16.0 | 54.0 | 0.50 | 1.50 |
| Aqueous concentrate | 18.9 |  |  | 20.8 | 9.0 | 32.0 | 30.0 |
| Solid $CaMoO_4$ | [1] 45.6 | 97.3 |  |  |  |  |  |

[1] Percent.

EXAMPLE III

*Removal of Thionates From Alkaline Leach Uranium Mill Molybdenum Pregnant Waste Bleed Stream and Synthetic Alkaline Sodium Thiosulfate Solutions*

This investigation was conducted to determine the thionate (calculated as sodium thiosulfate) distribution between the quaternary ammonium compound of Example II and alkaline aqueous solutions of thionates. A synthetic solution of sodium thiosulfate was used for control purposes and an alkaline leach uranium mill molybdenum pregnant waste bleed stream high in thionates, calculated as sodium thiosulfate was used for the runs in the continuous liquid-liquid extraction unit. In the one-stage extraction, 60 second contact an organic to aqueous ratio of 1 was used. The organic was stripped in three stages with 2 M NaCl at an organic to aqueous ratio of 5. In the continuous extraction the organic to aqueous to stripping ratio was 40 to 13.5 to 4.0 respectively. All other operating conditions were similar to those used in Example II. Material balances showing distribution of thionate values are shown in the following tables 4 and 5.

TABLE 4
*Material Balance for Batch Separatory Funnel Liquid-Liquid Extraction Study Using Synthetic Sodium Thiosulfate Solution*

| Product | One-state extraction, $Na_2S_2O_3$, g./l. | $Na_2S_2O_3$, grams | Percent distribution $Na_2S_2O_3$ |
|---|---|---|---|
| Aqueous feed (in) | 22.7 | 5.66 |  |
| Raffinate | 7.18 | 1.79 | 33.4 |
| Aqueous concentrate | 23.8 | 3.57 | 66.6 |
| Calculated feed (out) | 21.4 | 5.36 | 100.0 |

$$\frac{Out}{In} \times 100 = 94.7$$

A two-stage extraction removed 92.8 percent of available sodium thiosulfate.

TABLE 5
*Material Balance for Continuous Liquid-Liquid Extraction Study Using Alkaline Leach Uranium Mill Molybdenum-Thionate Pregnant Waste Bleed Stream*

| Product | $Na_2S_2O_3$, g./l. | $Na_2S_2O_3$, grams | Percent distribution $Na_2S_2O_3$ |
|---|---|---|---|
| Aqueous feed (in) | 18.3 | 152.5 |  |
| Raffinate | 2.2 | 18.3 | 12.1 |
| Aqueous concentrate | 54.2 | 133.5 | 87.9 |
| Calculated feet (out) | 18.2 | 151.8 | 100.0 |

$$\frac{Out}{In} \times 100 = 99.4$$

EXAMPLE IV

A vanadium pregnant alkaline carbonate solution from which uranium had been removed by caustic addition to neutralize all sodium bicarbonate to result in a solution of the following analysis was used:

Constituent—
    $V_2O_5$ _____grams per liter__ 0.87
    $U_3O_8$ _____do____ 0.14
    Mo _____do____ 2.52
    NaOH _____do____ 3.48
    $Na_2CO_3$ _____do____ 60.2
pH _____ 13.1

The organic phase used contained 11.0 volume percent of the quaternary ammonium chloride used in Example I, 7.5 volume percent isodecanol, and 81.5 volume percent kerosine. This organic phase was first scrubbed with 7.5 percent sulfuric acid to remove the chloride present. The extraction was carried out in three stages. The organic to aqueous phase ratio was one. The results are shown in the following Table 6.

TABLE 6

| Extraction stage | Equilibrium, pH | Raffinate analysis $V_2O_5$, grams per liter | Cumulative $V_2O_5$ extraction, percent |
|---|---|---|---|
| 1 | 11.8 | 0.81 | 6.1 |
| 2 | 9.8 | 0.49 | 43.7 |
| 3 | 9.3 | 0.21 | 75.9 |

This experimental data indicates that vanadium can be recovered from an alkaline solution with little difficulty. These data would seem to indicate that the optimum pH of extraction is near pH 9.3. A fourth stage would have removed the vanadium quantitatively.

EXAMPLE V

This example shows the selectivity of a quaternary ammonium compound toward vanadium in a sodium phosphate solution and also the effect of pH on extraction. The alkaline vanadium pregnant solution had the following analysis:

Constituent—
    $V_2O_5$ _____grams per liter__ 43.2
    P _____do____ 33.5
    NaOH _____do____ 7.0
pH _____ 10.9

The organic phase used contained 7.5 volume percent of a quaternary ammonium compound used in Example I, 5 volume percent isodecanol, and 87.5 volume percent kerosene. This organic phase was scrubbed with 15 percent sulfuric acid to remove the chloride present. A series of individual single stage extractions were carried out at an organic to aqueous phase ratio of five. The pH of this alkaline solution was adjusted by passing carbon dioxide gas into the aqueous feed. The results are shown in the following Table 7.

TABLE 7

Effect of pH on $V_2O_5$ Extraction With Quaternary Compound

| pH | | Reaffinate analysis, grams per liter $V_2O_5$ | Percent extraction $V_2O_5$ |
|---|---|---|---|
| Initial | Equilibrium | | |
| 8.95 | 8.60 | 6.44 | 85.2 |
| 9.50 | 9.30 | 6.06 | 85.9 |
| 10.0 | 9.80 | 8.33 | 80.7 |
| 10.5 | 10.18 | 15.5 | 64.0 |

The extracts were very low in phosphorus. The experimental data indicate that the vanadium can be extracted preferentially to the phosphorus thus making possible the production of a high purity vanadium concentrate. The optimum pH of extraction appears to be about 9.5.

EXAMPLE VI

This example shows the effect of using regenerated organic phase on the recovery of vanadium from alkaline leach solutions. A run was conducted in a continuous counter-current mixer-settler liquid-liquid extraction unit. The organic phase consisted of 11.0 volume percent of the quaternary ammonium compound used in Example I, 7.5 volume percent isodecanol, and 81.5 volume percent kerosine. The stripping reagent was 2M NaCl and the reagent used to remove the chloride from the stripped organic was 100 grams sulfuric acid per liter.

The aqueous alkaline carbonate solution was from a uranium mill and had the following analysis:

Constituent—
    $V_2O_5$ _____grams per liter__ 1.13
    $U_3O_8$ _____do____ 2.35
    Mo _____do____ 2.80
    $Na_2CO_3$ _____do____ 39.1
    $NaHCO_3$ _____do____ 20.7
    Cl _____do____ 2.1
pH _____ 9.6

The liquid-liquid extraction system contained four extraction stages, three stripping stages and one chloride removal stage. Flow rates of material fed to the system were as follows:

Material fed to system—     Millimeters per minute
    Organic phase_____ 30
    Aqueous feed_____ 30
    Strip solution_____ 4.2
    100 g./l. $H_2SO_4$_____ 8

The system was operated for six hours. Raffinate samples were taken and analyzed for $V_2O_5$ at sixty minute intervals. Data from this run appear in the following Table 8.

TABLE 8

Analytical Data From Continuous Liquid-Liquid Extraction of Vanadium With Quaternary Compounds

| Hours of operation | Raffinate analysis $V_2O_5$ grams per liter | Percent extraction $V_2O_5$ |
|---|---|---|
| 1 | 0.25 | 77.9 |
| 2 | 0.29 | 74.4 |
| 3 | 0.29 | 74.4 |
| 4 | 0.31 | 72.5 |
| 5 | 0.27 | 76.1 |
| 6 | 0.28 | 75.2 |

The experimental data indicate that the recovery of vanadium is not affected by using regenerated organic phase for the extraction of vanadium. This six hour run represents approximately six complete cycles of organic phase through the system.

The foregoing examples illustrate the recovery of molybdenum and/or vanadium from aqueous acid and alkaline solutions. This recovery is effected in the presence of carbonate, thionate and phosphate ions, which are likely to be present in aqueous solutions commonly encountered in everyday commercial operations. Examples IV, V, and VI serve to illustrate the extraction of vanadium from a variety of aqueous solutions. Examples IV and VI illustrate the recovery from an alkaline solution encountered in uranium processing, such as was illustrated with recovery of molybdenum. Example V illustrates recovery from an aqueous solution containing phosphate ions, which is also applicable to molybdenum.

While certain specific embodiments of our invention have been illustrated it is understood that various modifications can be resorted to, but the invention is to be limited to the scope of the appended claims.

The embodiments of the invention in which an exclusive property or privilege is claimed are defined as follows:

1. In a process of recovering metals selected from the group consisting of vanadium and molybdenum from an aqueous solution having an alkaline pH the step of contacting said alkaline aqueous metal-containing solution with a quaternary ammonium compound having three long chain aliphatic hydrocarbon groups each having from 8 to 18 carbon atoms to extract said metals from said alkaline aqueous solution.

2. A process as defined in claim 1 in which said quaternary ammonium compound has three long chain aliphatic hydrocarbon groups each having from 8 to 18 carbon atoms and one alkyl group having from 1 to 4 carbon atoms.

3. A process as defined in claim 2 in which said alkyl group is methyl.

4. A process for the recovery of metals selected from the group consisting of vanadium and molybdenum from an alkaline aqueous solution comprising contacting said alkaline aqueous solution with an organic phase containing a quaternary ammonium compound having three long chain aliphatic hydrocarbon groups each having from 8 to 18 carbon atoms to extract said metals into said organic phase, separating the resultant metal-pregnant organic phase from the resultant metal-barren aqueous phase, contacting said metal-pregnant organic phase with an aqueous stripping medium to strip said metal from the metal-pregnant organic phase and separating the resultant metal-pregnant aqueous stripping medium from the organic phase.

5. A process as defined in claim 4 in which said stripping medium is sodium chloride.

6. In a process for recovering vanadium values from aqueous alkaline solutions the step of contacting the alkaline aqueous vanadium-containing solution with a quaternary ammonium compound having three long chain aliphatic hydrocarbon groups each having from 8 to 18 carbon atoms to produce an extract containing said vanadium values.

7. A process for the recovery of vanadium values from an aqueous alkaline solution containing said vanadium values comprising contacting said alkaline aqueous solution with an organic phase containing a quaternary ammonium compound having three long chain aliphatic hydrocarbon groups each having from 8 to 18 carbon atoms to extract said vanadium values into said organic phase, separating the resultant vanadium barren aqueous phase from the vanadium-pregnant organic phase, contacting said vanadium-pregnant organic phase with an aqueous stripping medium to strip said vanadium from the vanadium-pregnant organic phase and separating the resultant vanadium-containing aqueous concentrate from said organic phase.

8. A process as defined in claim 7 in which said stripping medium is an aqueous solution of sodium sulfate and sodium hydroxide.

9. A process for the recovery of vanadium values from an aqueous alkaline phosphate solution containing said vanadium values comprising contacting said aqueous alkaline solution with an organic phase containing a quaternary ammonium compound having three long chain aliphatic hydrocarbon groups each having from 8 to 18 carbon atoms to produce a vanadium-pregnant organic phase and a phosphate-pregnant aqueous phase, separating said vanadium-pregnant organic phase from said phosphate-pregnant aqueous phase, contacting said vanadium-pregnant organic phase with an aqueous stripping medium to strip said vanadium values from said vanadium-pregnant organic phase and separating the resultant vanadium-pregnant phosphate-barren aqueous concentrate from said organic phase.

10. A process as defined in claim 9 in which said aqueous phosphate solution containing said vanadium values has a pH of about 9.5.

11. A process for recovering molybdenum from a thionate-carbonate and bicarbonate-containing aqueous alkaline solution containing said molybdenum comprising contacting said alkaline solution with an organic phase containing a quaternary ammonium compound having three long chain aliphatic hydrocarbon groups each having from 8 to 18 carbon atoms to produce a molybdenum-thionate-carbonate pregnant organic phase, separating the resultant organic phase from said aqueous solution contacting said pregnant organic phase with an aqueous scrubbing medium to produce a molybdenum-thionate-carbonate pregnant aqueous solution, precipitating the carbonate from said solution to provide a molybdenum-thionate aqueous solution, precipitating the molybdenum from said molybdenum-thionate solution to provide a thionate-free molybdenum precipitate and separating the resultant thionate-free molybdenum precipitate from the resultant thionate-pregnant aqueous solution.

References Cited in the file of this patent

UNITED STATES PATENTS

| | | |
|---|---|---|
| 2,227,833 | Hixson et al. | Jan. 7, 1941 |
| 2,877,250 | Brown et al. | Mar. 10, 1959 |